United States Patent
Goldberg et al.

(10) Patent No.: US 11,226,949 B2
(45) Date of Patent: *Jan. 18, 2022

(54) MULTIPLE WORKSPACE DATABASE ENGINE

(71) Applicant: eBay Inc., San Jose, CA (US)

(72) Inventors: Roman Goldberg, Atlit (IL); Guy Rozenwald, Netanya (IL); Amit Gottlieb, Tel Aviv (IL); Amir Harel, Netanya (IL)

(73) Assignee: eBay Inc., San Jose, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/057,714

(22) Filed: Aug. 7, 2018

(65) Prior Publication Data

US 2018/0349427 A1     Dec. 6, 2018

Related U.S. Application Data

(63) Continuation of application No. 15/217,063, filed on Jul. 22, 2016, now Pat. No. 10,095,726.

(51) Int. Cl.
*G06F 16/23* (2019.01)
*G06F 16/25* (2019.01)
(Continued)

(52) U.S. Cl.
CPC .............. *G06F 16/23* (2019.01); *G06F 16/25* (2019.01); *G06F 16/26* (2019.01); *G06F 16/9024* (2019.01)

(58) Field of Classification Search
None
See application file for complete search history.

(56) References Cited

U.S. PATENT DOCUMENTS 5,983,277 A * 11/1999 Heile ................. G01R 31/3177
709/232
6,408,290 B1   6/2002 Thiesson et al.
(Continued)

FOREIGN PATENT DOCUMENTS

WO     2018/017826 A1     1/2018

OTHER PUBLICATIONS

International Preliminary Report on Patentability received for PCT Patent Application No. PCT/US2017/043058, dated Jan. 31, 2019, 9 pages.

(Continued)

*Primary Examiner* — Son T Hoang
(74) *Attorney, Agent, or Firm* — Fig. 1 Patents

(57) ABSTRACT

In various example embodiments, multiple workspaces have access to modify values in a graph database. The graph database can comprise a collection of entity nodes, where each entity node is connected to an identifier node and one or more state nodes. An update to an entity node can be recorded by generating a new state node to store the update and connecting the new state node to the entity node. How each workspace views the database is based, at least in part, on which state nodes are associated with each workspace. The workspaces are independent of one another, and changes made to an entity node in one workspace do not affect how another workspace views the same entity node. By managing database data for each of the workspaces using the same graph database and recording changes in state nodes in an additive manner, the computational overhead is greatly reduced and simplified.

20 Claims, 12 Drawing Sheets

(51) Int. Cl.
*G06F 16/26* (2019.01)
*G06F 16/901* (2019.01)

(56) References Cited

U.S. PATENT DOCUMENTS

| | | | |
|---|---|---|---|
| 6,823,299 B1 | 11/2004 | Contreras et al. | |
| 7,054,910 B1* | 5/2006 | Nordin | G06F 16/182 |
| | | | 707/999.202 |
| 7,171,410 B1* | 1/2007 | Neufeld | G06F 16/20 |
| | | | 707/703 |
| 7,720,779 B1* | 5/2010 | Perry | G06N 5/04 |
| | | | 706/45 |
| 8,775,476 B2 | 7/2014 | Henderson | |
| 9,542,164 B1* | 1/2017 | Mosterman | G06F 16/23 |
| 9,600,401 B1 | 3/2017 | Haischt et al. | |
| 10,095,726 B2 | 10/2018 | Goldberg et al. | |
| 2002/0152271 A1* | 10/2002 | Chafle | G06F 16/1834 |
| | | | 707/E17.007 |
| 2009/0276471 A1* | 11/2009 | Baer | G06F 16/93 |
| 2010/0293598 A1* | 11/2010 | Todd | H04N 21/64753 |
| | | | 726/3 |
| 2011/0087973 A1 | 4/2011 | Martin et al. | |
| 2012/0150498 A1 | 6/2012 | Shastri et al. | |
| 2014/0046982 A1 | 2/2014 | Chan et al. | |
| 2014/0095929 A1* | 4/2014 | Chan | G06F 11/1438 |
| | | | 714/20 |
| 2014/0222892 A1* | 8/2014 | Lee | H04L 12/2825 |
| | | | 709/203 |
| 2014/0236972 A1 | 8/2014 | William | |
| 2014/0289333 A1* | 9/2014 | Chan | G06F 16/9535 |
| | | | 707/732 |
| 2017/0244742 A1* | 8/2017 | Helmsen | G06F 16/23 |
| 2017/0300701 A1 | 10/2017 | Ponta et al. | |
| 2017/0351726 A1* | 12/2017 | Dean | G06F 16/2246 |
| 2018/0025040 A1 | 1/2018 | Goldberg et al. | |

OTHER PUBLICATIONS

Notice of Allowance received for U.S. Appl. No. 15/217,063, dated Jun. 7, 2018, 19 pages.
International Search Report received for PCT Patent Application No. PCT/US2017/043058, dated Sep. 22, 2017, 3 pages.
Written Opinion received for PCT Patent Application No. PCT/US2017/043058, dated Sep. 22, 2017, 7 pages.

* cited by examiner

MULTIPLE WORKSPACE DATABASE ENGINE

RELATED APPLICATIONS

This application is a continuation of and claims priority to U.S. patent application Ser. No. 15/217,063, filed Jul. 22, 2016, entitled "Multiple Workspace Database Engine", the entire disclosure of which is hereby incorporated by reference herein in its entirety.

TECHNICAL FIELD

Embodiments of the present disclosure relate generally to database operations and, more particularly, but not by way of limitation, to managing multiple workspaces using a database engine.

BACKGROUND

Databases are used to manage data for networked systems. In some cases, multiple administrators have access to and manage the same database in parallel. Multiple administrators having management-level access to the same database causes consistency issues. In some cases, each of the different administrators requires different views of a database. For example, a first administrator may want to view the database arranged in a first way, while a second administrator may want to view the same database arranged in a second way, different from the first way. The administrators may further make changes to values in the database from different views. Keeping a database consistent while allowing multiple administrators management-level access, while allowing each of the administrators to manage the database in potentially different views, and while tracking changes made from different views is a complex task that requires large amounts of computational overhead.

BRIEF DESCRIPTION OF THE DRAWINGS

Various ones of the appended drawings merely illustrate example embodiments of the present disclosure and should not be considered as limiting its scope.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

In various example embodiments, multiple workspaces have access to modify values of a graph database that is organized as a collection of entity nodes, where each entity node is connected to an identifier node and one or more state nodes. Connections between nodes correspond to relationships between nodes. For example, an entity node may be stored as a data object that references which other nodes the entity node is connected to. Connections may in some example embodiments be visually depicted by lines or edges connecting the nodes in the graph database. An entity node corresponds to a data item to be tracked in the graph database. Changes to entity nodes are recorded by generating a new state node to store the change and connecting the new state node to the entity node. How each workspace views the database is based, at least in part, on which state nodes are associated with each workspace. The workspaces are independent of one another, and changes made to an entity node in one workspace do not affect how another workspace views the same entity node in the graph database. By managing database data for each of the workspaces using the same graph database and recording changes in state nodes in an additive manner, the computational overhead is greatly reduced and simplified.

Figure 1:
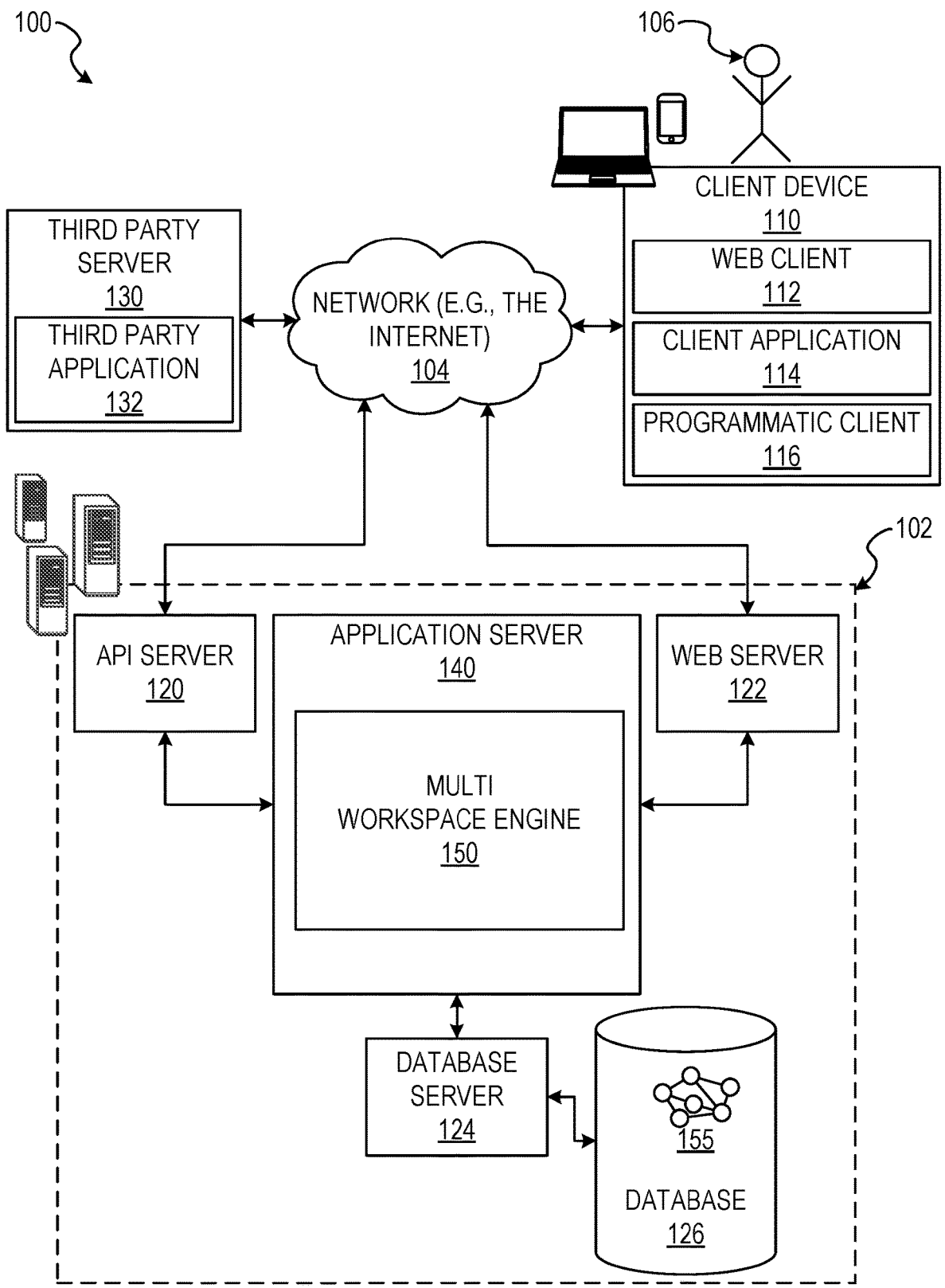
FIG. 1 is a block diagram illustrating various functional components of a multi workspace engine implemented in a network environment, according to some example embodiments.

FIG. 1 is a block diagram illustrating various functional components of a multi workspace engine implemented in a network architecture 100, according to some example embodiments. A networked system 102 provides server-side functionality via a network 104 (e.g., the Internet or a wide area network (WAN)) to one or more client devices 110. In some implementations, a user (e.g., user 106) interacts with the networked system 102 using the client device 110. FIG. 1 illustrates, for example, a web client 112 (e.g., an Internet browser), an application 114, and a programmatic client 116 executing on the client device 110. The client device 110 includes the web client 112, the application 114, and the programmatic client 116 alone, together, or in any suitable combination. Although FIG. 1 shows one client device 110, in other implementations, the network architecture 100 comprises multiple client devices 110.

In various implementations, the client device 110 comprises a computing device that includes at least a display and communication capabilities that provide access to the networked system 102 via the network 104. The client device 110 comprises, but is not limited to, a remote device, work station, computer, general-purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic system, game console, set-top box, network personal computer (PC), minicomputer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a Wireless Fidelity (WI-FI®) network, a worldwide interoperability for microwave access (WiMax) network, another type of network, or any suitable combination thereof.

In some example embodiments, the client device 110 includes one or more of the applications 114 (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the application 114 includes various components operable to present information to the user 106 and communicate with the networked system 102.

The web client 112 accesses the various systems of the networked system 102 via the web interface supported by a web server 122. Similarly, the programmatic client 116 and application 114 access the various services and functions provided by the networked system 102 via the programmatic interface provided by an application programming interface (API) server 120. The programmatic client 116 can, for example, be a seller application (e.g., the Turbo Lister application developed by EBAY® Inc., of San Jose, Calif.) to enable sellers to author and manage listings on the networked system 102 in an offline manner, and to perform batch-mode communications between the programmatic client 116 and the networked system 102.

Users (e.g., the user 106) comprise a person, a machine, or another means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application servers 140. The application server 140 can host a multi workspace engine 150, which comprises one or more modules or applications, each of which can be embodied as hardware, software, firmware, or any combination thereof. The application server 140 is, in turn, shown to be coupled to one or more database servers 124 that facilitate access to one or more information storage repositories or databases 126. In an example embodiment, the database 126 is a storage device that stores information in a graph database 155. The graph database 155 can be accessed by administrators operating through different client devices 110. In some example embodiments, the multiple administrators access data from the graph database 155 through different workspaces. Different workspaces are different in that they are kept as distinct environments that display data from the graph database 155. In some example embodiments, each administrator accesses a workspace using login credentials (e.g., username, password).

Additionally, a third party application 132, executing on a third party server 130, is shown as having programmatic access to the networked system 102 via the programmatic interface provided by the API server 120. For example, the third party application 132, utilizing information retrieved from the networked system 102, supports one or more features or functions on a website hosted by a third party. Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the application server 140 (e.g., the multi workspace engine 150) can also be implemented as standalone software programs, which do not necessarily have networking capabilities.

Figure 2:
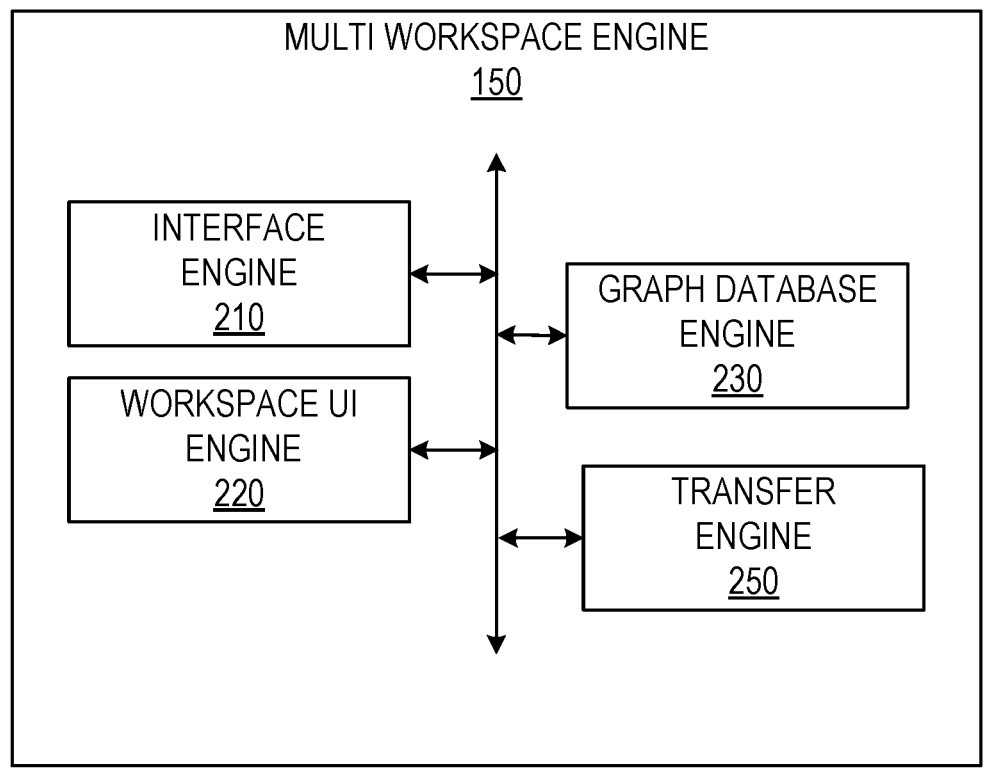
FIG. 2 illustrates a block diagram showing various functional modules of a multi workspace engine, according to some example embodiments.
Figure 5A:
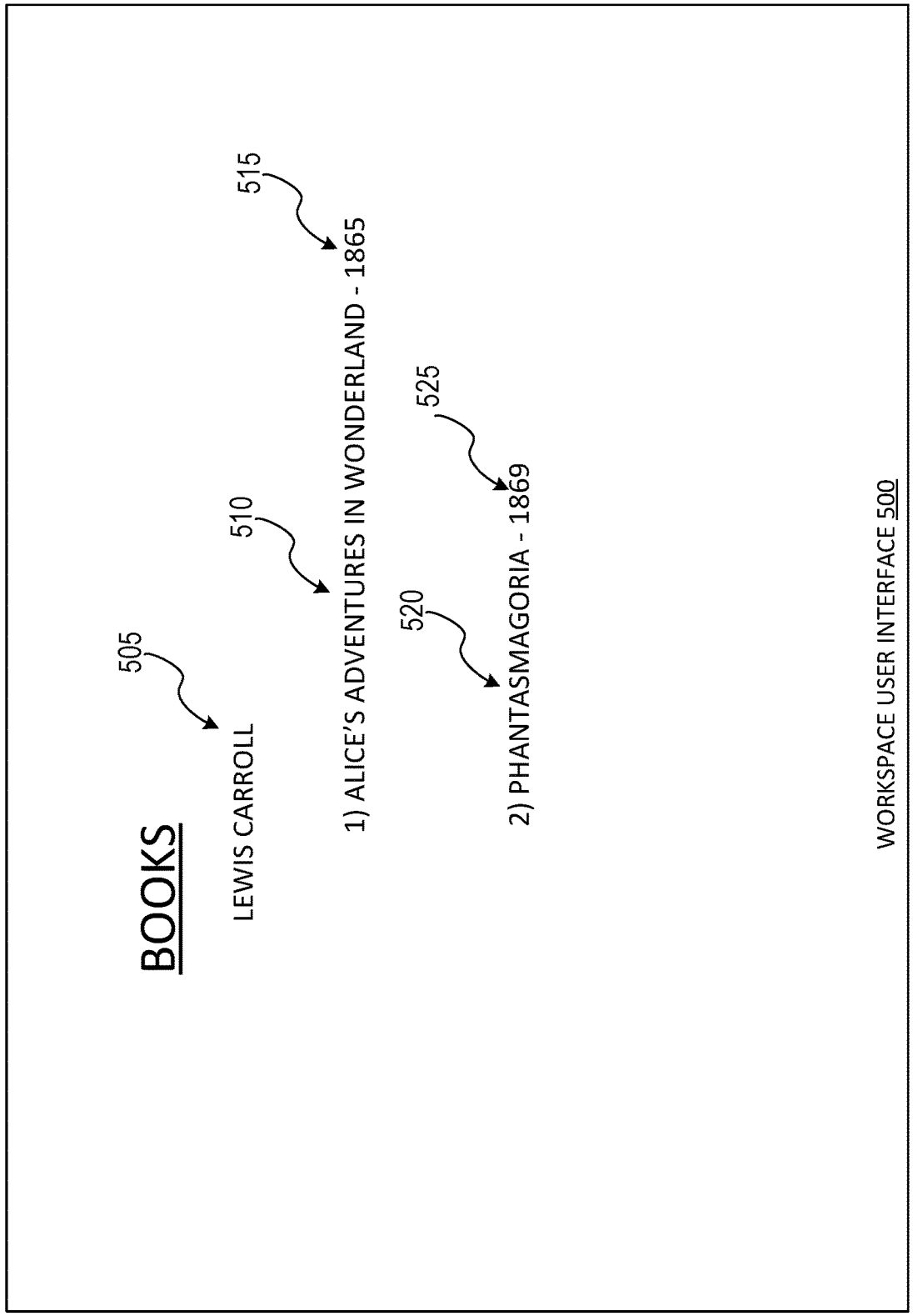
FIG. 5A illustrates a workspace user interface generated from graph database data, according to some embodiments.
Figure 5B:
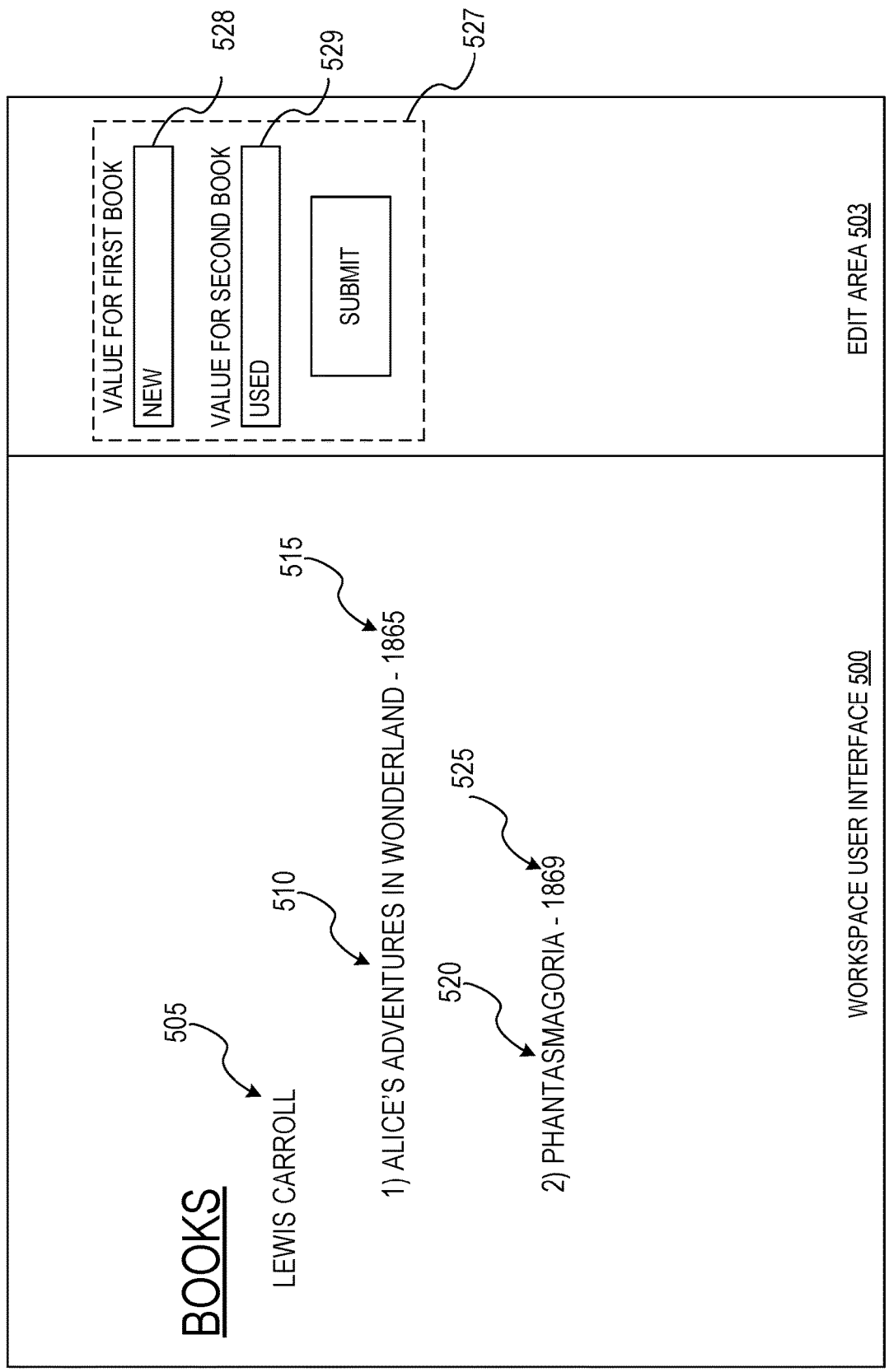
FIG. 5B illustrates a workspace user interface with an edit area, according to some example embodiments.
Figure 6:
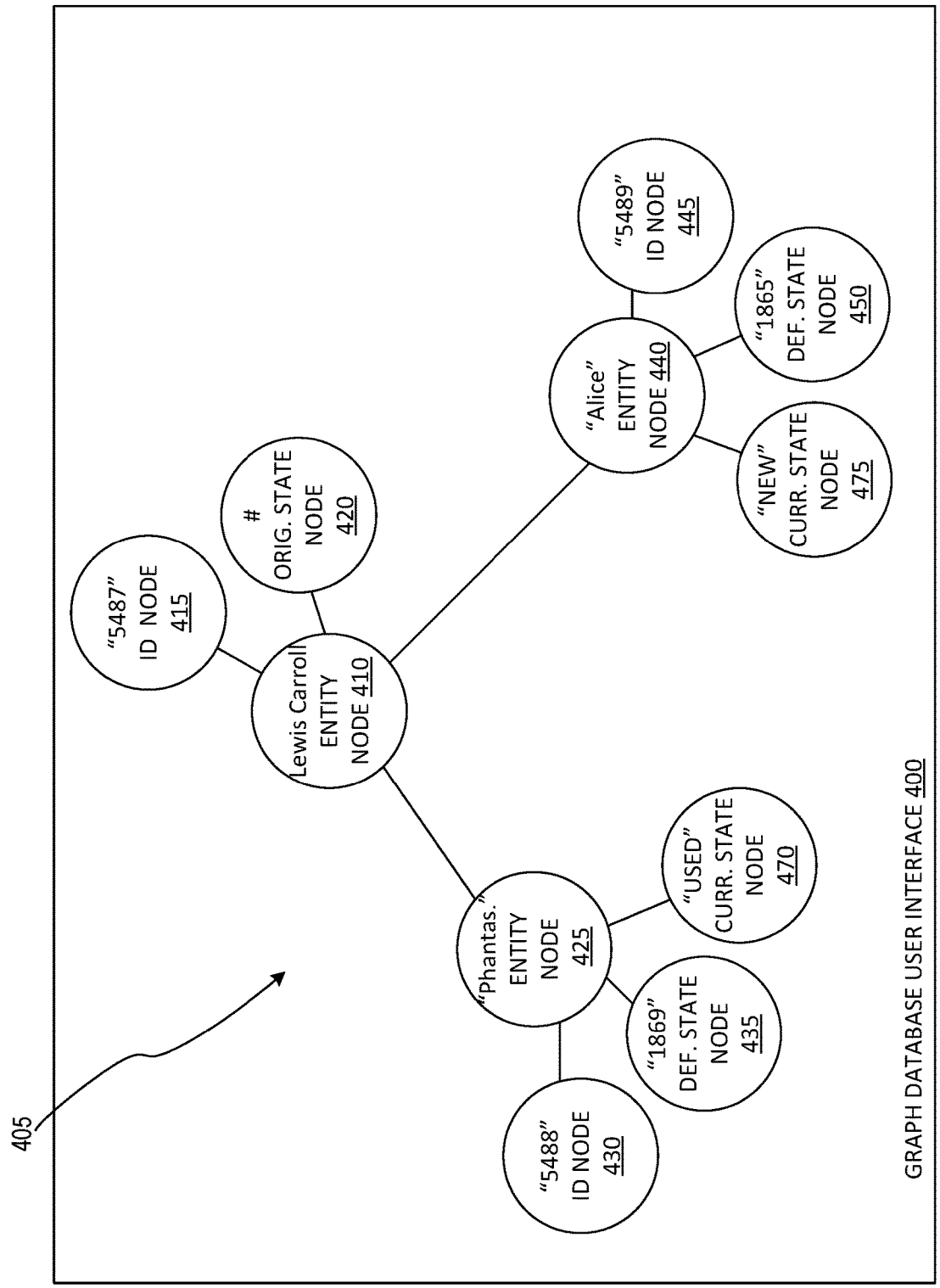
FIG. 6 illustrates a graph data structure comprising an updated plurality of nodes, according to some example embodiments.
Figure 7:
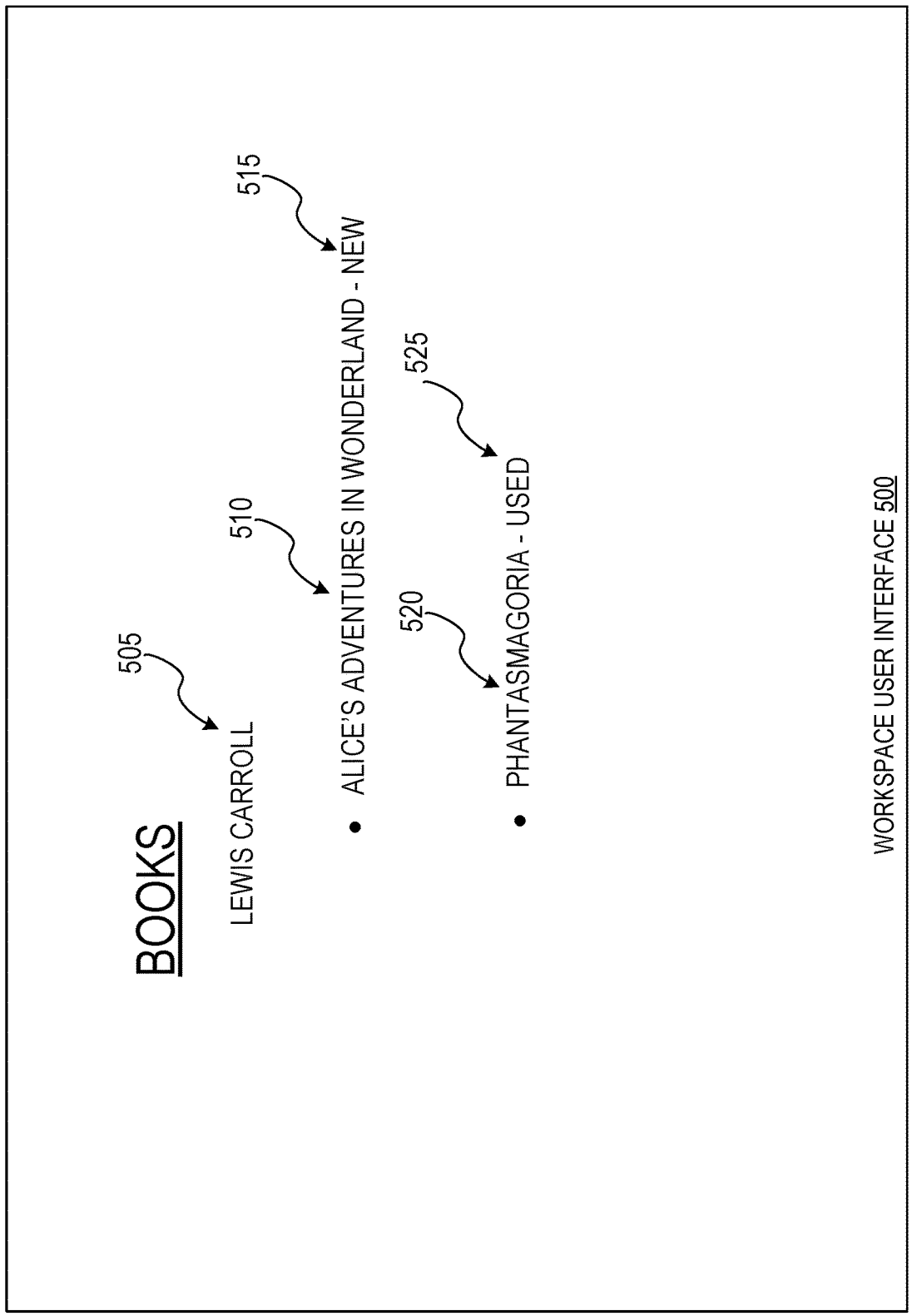
FIG. 7 illustrates a workspace user interface updated with data from an updated graph database, according to some embodiments.

FIG. 2 illustrates a block diagram showing various functional modules of the multi workspace engine 150, according to some example embodiments. The components themselves are communicatively coupled (e.g., via appropriate interfaces) to each other and to various data sources, so as to allow information to be passed between the applications or so as to allow the applications to share and access common data. Furthermore, the components access the one or more databases 126 via the database server 124. As illustrated, the multi workspace engine 150 comprises an interface engine 210, a workspace user interface (UI) engine 220, a graph database engine 230, and a transfer engine 250. The interface engine 210 manages communications with different network components (e.g., communications with the third party server 130 or the client device 110) over the network 104. The workspace UI engine 220 is responsible for generating user interfaces for different workspaces and their corresponding node datasets. According to some example embodiments, a workspace is a user interface environment that allows a user to make changes to data being tracked by a database 126. A workspace may include a displayed user interface, as well as configuration data used to configure the given workspace. The configuration data, in some example embodiments, includes node set data which defines which nodes of the graph database 155 a given workspace displays and manages. Examples of workspaces are illustrated in FIGS. 5A, 5B, and 7. The data displayed in the workspaces is tracked on the backend, e.g., in the graph database 155. For example, in FIG. 7, the Lewis Carroll data element 505 is tracked by entity node 410 (FIG. 6).

According to some example embodiments, a given workspace displays data according to with which nodes of a graph database 155 the given workspace is associated. The nodes which a given workspace can view, edit, or manage are in the given workspace's node set. For example, assume that a graph database 155 comprises five nodes: A, B, C, D, and E, and further assume that the graph database 155 is viewable through two workspaces: workspace_1 and workspace_2. Workspace_1 may be associated with nodes A, B, and C, but not associated with nodes D or E. Accordingly, workspace_1 can display data values from nodes A, B, and C, in a user interface (e.g., workspace user interface 500 of FIG. 5A). However, workspace_1 does not display data values from nodes D and E because workspace_1 is not associated with nodes D and E (e.g., nodes D and E are not in workspace_1's node set). Similarly, if workspace_2 is associated only with node D, workspace_2 only displays node D data in its user interface.

In some embodiments, a plurality of workspaces display data from the same graph database 155, and each of the workspaces has a corresponding node set made up of nodes in the graph database 155. In some embodiments, to simplify workspace management, each workspace is isolated from the other workspaces in that changes in each workspace do not affect nodes displayed in another workspace.

The graph database engine 230 manages updating and managing the database 126 including the graph database structure 155 (FIG. 1). In at least some example embodiments, the graph database engine 230 is configured to generate entity nodes as sets of nodes, where each entity node is generated with a connected identification (ID) node and a connected state node. The ID node persistently (e.g., permanently) identifies its connected entity node in the system. The state node stores the current value of the entity node. In some embodiments, an entity node is connected to a default state node that stores the original value (e.g., initial value) of the entity node. In some example embodiments, the default value is the value assigned to the entity node upon the entity node being created in the graph database 155. In some example embodiments, the default state is the initial state for the entity node before one or more state changes to the entity node occur. In some example embodiments, the default state node is set to a newly created node. For example, an entity node may have an original default state node, and a current state node that reflects an update to the entity node. In those example embodiments, the default state node can be set to the current state node, and subsequent updates cause newer current state nodes to be created. In this way, when resetting nodes to their default value, the default value can be shifted to different times and values.

In some example embodiments, changes to the default state node are stored in subsequently created current state nodes, which are created and connected to the entity node. In some embodiments, when the value of a given entity node is updated, the graph database engine 230 does not delete the default state node (or the existing current state node) but rather connects a new current state node and stores a latest update value in the most recently created current state node. The changes made by a first workspace may cause the graph database engine 230 to create a new current state node for an entity node, while maintaining the previous state node for other workspaces to track and use (e.g., the previous state nodes are in the node sets of the other workspaces).

The transfer engine 250 manages transferring one or more nodes between workspaces. In some example embodiments, all nodes are tracked in a single graph database 155, which is portioned off into node sets for different workspaces to use. When one or more nodes are to be transferred from a source workspace to a destination workspace, the transfer engine 250 may reset the transferred entity nodes to their default state node values.

Figure 3A:
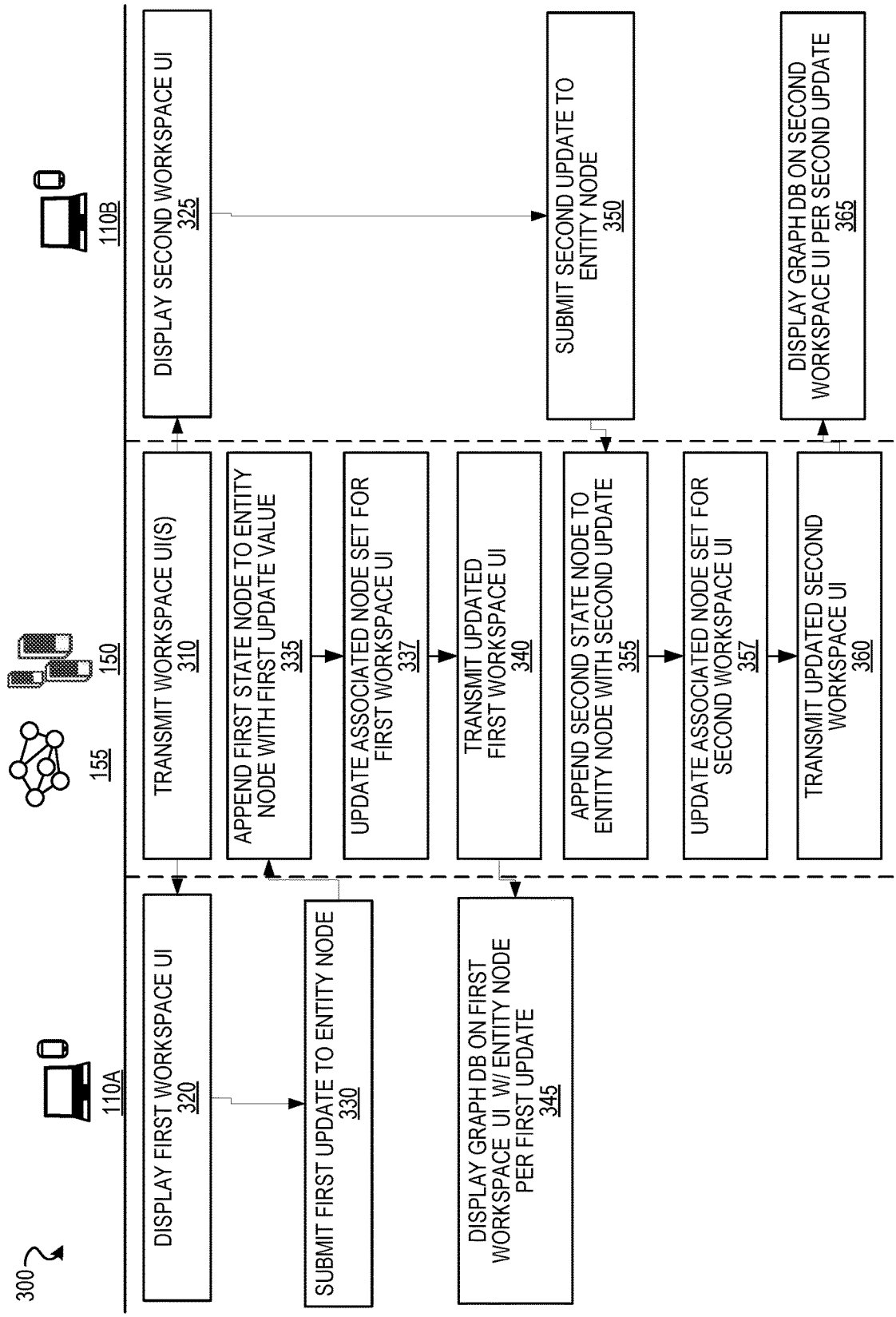
FIG. 3A illustrates an interaction diagram of multiple client devices performing updates to a graph data structure, according to some embodiments.

FIG. 3A displays multiple client devices performing updates to a graph data structure, according to some embodiments. FIG. 3A displays an interaction diagram 300 depicting network interactions between a client device 110a, a client device 110b, and a multi workspace engine 150 which is managing a graph database 155. Each column of the interaction diagram 300 corresponds to actions performed by the entity at the top of the column. For example, the client device 110a performs operations 320, 330, and 345. Data values generated at a given operation may be transferred over the dotted lines which can signify, in some example embodiments, transfers over the network 104.

In the example embodiments illustrated in FIG. 3A, the client device 110a is making changes in a first workspace, through a first workspace user interface. The first workspace is associated with a first node set comprising nodes in the graph database 155. Similarly, the client device 110b is making changes in a second workspace, through a second workspace user interface. The second workspace is associated with a second node set comprising nodes in the graph database 155. The nodes in the first and second node sets can overlap. For example, each of the first and second node sets may make changes to the same entity node. FIG. 3A shows an example method of two different workspaces both making changes to the same entity node.

At operation 310, the multi workspace engine 150 transmits workspace user interfaces to the client devices 110a, 110b. For example, the multi workspace engine 150 transmits the first workspace user interface of a first workspace to the first client device 110a and transmits the second workspace interface of a second workspace to the second client device 110b. At operation 320, the client device 110a displays the first workspace user interface. At operation 330, a user 106 of the client device 110a submits a first update to an entity node. For example, the user 106 changes the entity node value from "published year" to "book condition". At operation 335, the multi workspace engine 150 receives the change to the entity node, and connects a state node storing the value of "book condition". At operation 337, the multi workspace engine 150 updates the first node set so that the first workspace is associated with the state node storing the value "book condition", and de-associates the state node storing the value "published year" from the first node set.

At operation 340, the multi workspace engine 150 transmits the updated first workspace user interface to the client device 110a for display within the first workspace user interface. At operation 345, the first client device 110a displays the first workspace user interface per the updated first node set, which now reflects the value of the entity node as "book condition".

As discussed, the changes by different workspaces do not affect other workspaces. Thus, the changes by the client device 110a in the first workspace do not affect the client device 110b in the second workspace. Thus, according to some example embodiments, the client device 110b displays the second workspace with the entity node still reflecting the "published year" value. Continuing at operation 325, the second client device 110b displays the second workspace user interface that was received from the multi workspace engine 150. At operation 350, the second client device 110b submits a second update to the same entity node that was modified in operation 330 by the client device 110a. As the two workspaces are independent, the second workspace still sees the entity node as having the "published year" value in its state node. The update to the entity node performed at operation 350 may, for example, request that the entity node value be changed from "published year" to "book size".

At operation 355, the multi workspace engine 150 receives the second state node update from the second workspace user interface, generates a new current state node storing the value "book size", and connects the state node to the entity node in the graph database 155.

After the graph database 155 has been updated, the change still needs to be reflected in the second workspace. Thus, at operation 357, the multi workspace engine 150 updates the second node set for the entity by removing the state node storing the value of "published year" from the second node set, and inserting the state node storing the value of "book size" in the second node set.

At operation 360, the multi workspace engine 150 transmits an updated second workspace user interface to the second client device 110b. At operation 365, the second client device 110b displays the second workspace user interface that displays the value of "book size" for the entity node.

Figure 3B:
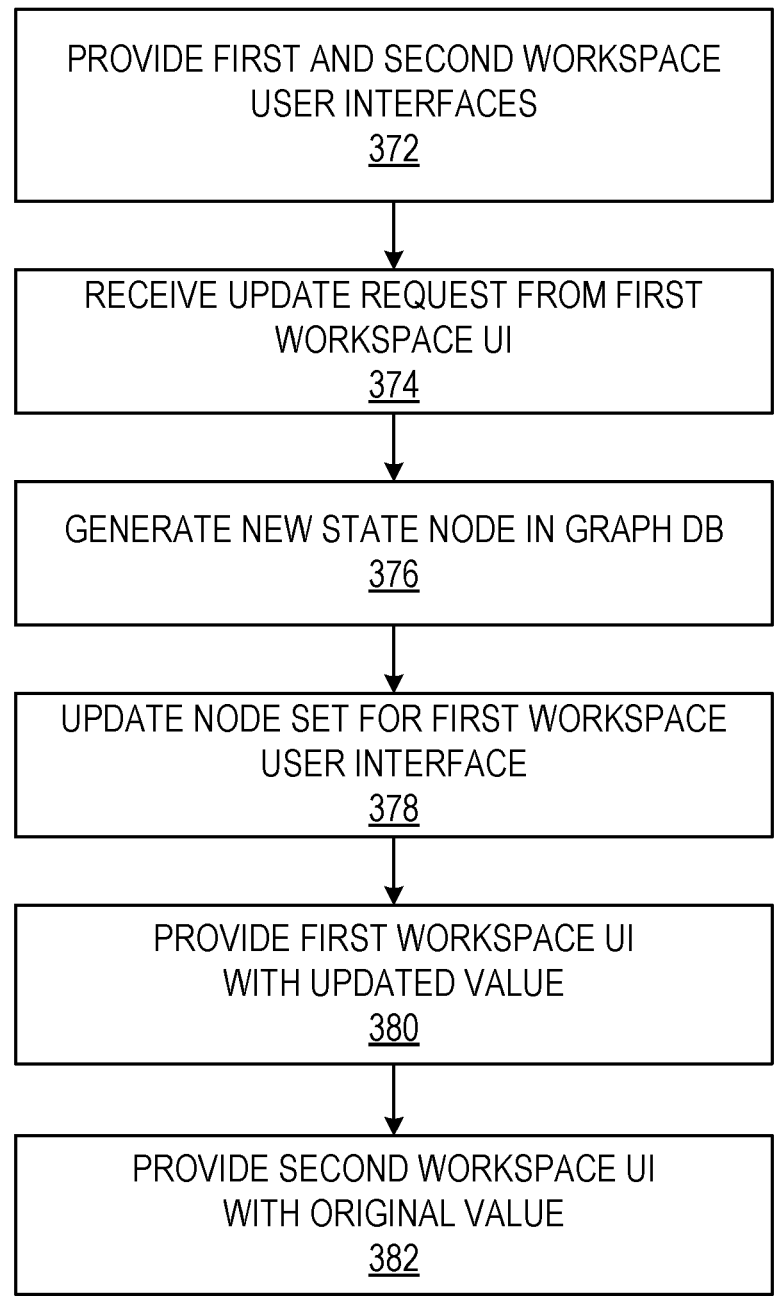
FIG. 3B illustrates a flow diagram of a method for performing updates to a graph data structure, according to some embodiments.

FIG. 3B illustrates a method 370 for performing multi workspace database updates on the same machine, according to some embodiments. For example, in some embodiments, the same server may manage the graph database operations, generate and display the first and second workspace user interfaces, and make changes to the graph database 155 and workspaces. At operation 372, the multi workspace engine 150 provides the first and second workspace user interfaces for display on the display screen of the client device 110. At operation 374, the multi workspace engine 150 receives an update request from the first workspace user interface. At operation 376, a new state node is generated in the graph database structure. At operation 378, the first workspace user interface node set is updated to include the new state node such that the first workspace user interface displays values from the new state node update. At operation 380, the multi workspace engine 150 provides the first workspace user interface with the updated value for display on the client device 110. At operation 382, the multi workspace engine 150 displays or provides for display the second workspace user interface that retains the default value of the node, not updated.

Figure 4:
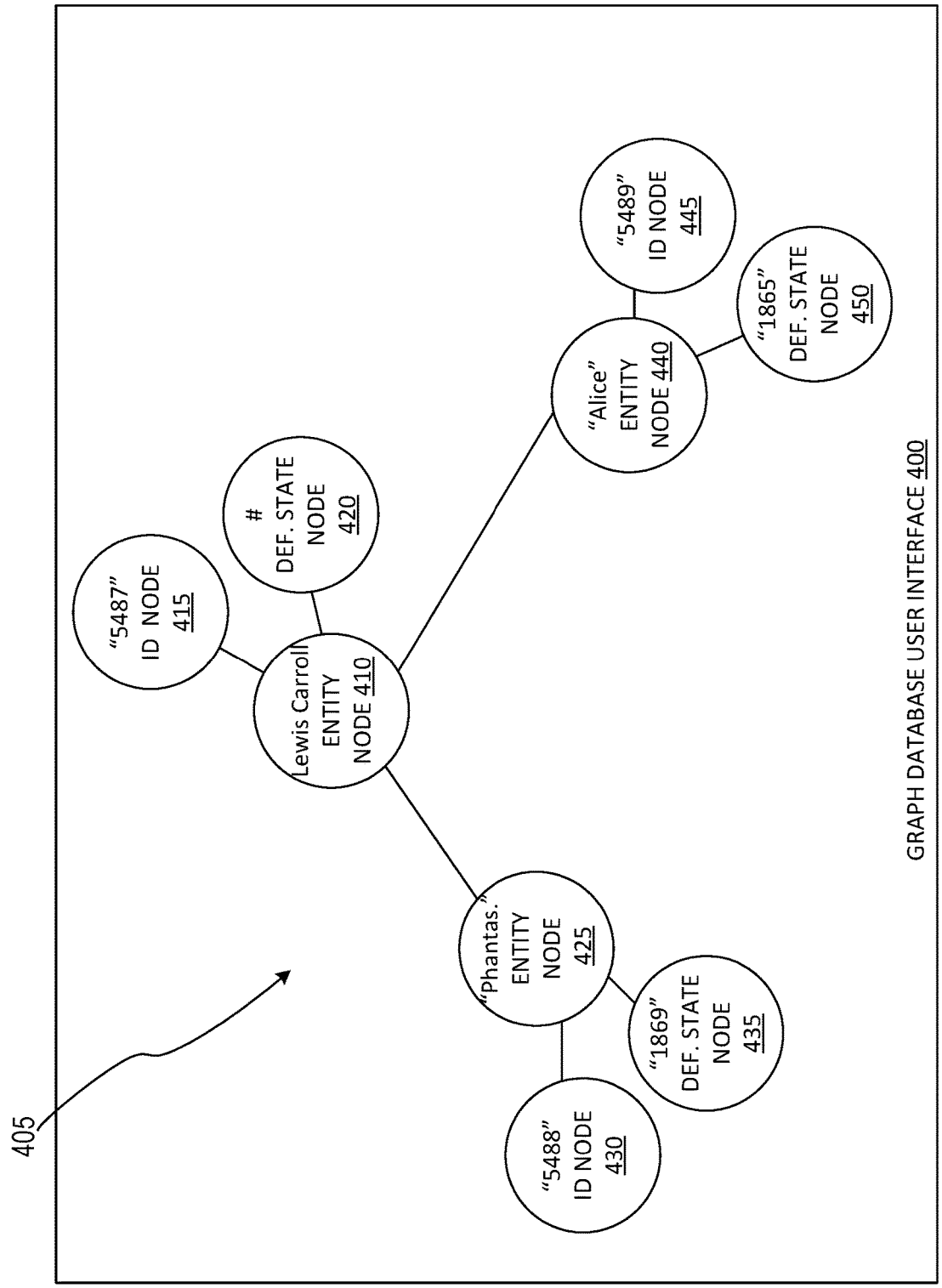
FIG. 4 illustrates a graph data structure comprising a plurality of nodes, according to some example embodiments.

FIG. 4 illustrates a graph data structure 405 comprising a plurality of nodes, according to some example embodiments. In some example embodiments, the graph data structure can be displayed on a user interface of a computer, such as graph database user interface 400 generated from a graph database application (e.g., Neo4j). The nodes in the graph data structure 405 are represented by circles. The edges connecting the nodes are depicted as lines that connect the circles (e.g., nodes). In the graph data structure 405, an entity node corresponds to a data item to be managed for display or tracking in the graph data structure 405. For example, an entity node 410 corresponds to "Lewis Carroll", the author. The Lewis Carroll entity node 410 is a parent to an entity node 425, which corresponds to "Phantasmagoria", a title of a book that Lewis Carroll wrote. The entity node 410 is also parent to an entity node 440 which has a value of "Alice", which is a short version of "Alice's Adventures in Wonderland", which is another book that Lewis Carroll wrote. Thus, the graph data structure 405 is managing books that a given author (Lewis Carroll) wrote. It is appreciated that the graph data structure 405 can be used to track any sort of data items, and not just authors and books.

According to some example embodiments, each entity node has two nodes associated with it, an ID node and a default state node. For example, the Lewis Carroll entity node 410 has an ID node 415 and a default state node 420 connected to it. In FIG. 4, the ID node 415 has an identifier key value of 5487. As explained, in some example embodiments, the ID node for a given entity node stays the same, and functions as a persistent (e.g., permanent) identifier for the connected entity node. Changes to the entity node are recorded in the state nodes, not the ID node. As explained above, the default state node 420 captures the default value or state of the Lewis Carroll entity node 410. Not all state nodes need store a default value for a connected entity node. For example, the default state node 420 does not store a value for the Lewis Carroll entity node 410, as indicated by the example null hashtag "#". Referring to the entity node 425, which is the entity node for "Phantasmagoria", one of Lewis Carroll's books, the associated ID node 430 has a key value of 5488 and the default state node 435 reflects the year "1869", which is the year Phantasmagoria was published. Similarly, the Alice entity node 440 has an ID node 445 with a key value of 5489. The Alice entity node 440 is further associated with a default state node 450, which has a value of the year "1865", which is the year that Alice's Adventures in Wonderland was first published.

FIG. 5A illustrates a workspace user interface 500 generated from graph database data, according to some embodiments. The graph data structure 405 can be used as a data source to generate user interfaces such as the workspace user interface 500, illustrated in FIG. 5A. In some example embodiments, the workspace user interface 500 shows a display of what will be generated and available on the front-end (e.g., public facing) side of a given website. Workspaces have the ability to view data elements in a what you see is what you get (WYSIWYG) manner. The data elements are generated from data values from the graph data structure 405. In particular, a data element 505 corresponds to the entity node 410, a data element 510 corresponds to the entity node 440, a data element 520 corresponds to the entity node 425, a data element 515 corresponds to the default state node 450, and a data element 525 corresponds to the default state node 435. The workspace user interface 500 may be generated from programmatic code that specifies which data values to retrieve from the graph data structure 405. For example, the data element 515 may be generated from programmatic code configured to display, as the data element 515, the current value of the node having the permanent ID of 5489. The graph database engine 230 determines that the Alice entity node 440 is associated with the ID node 445 (which is identified by the permanent ID value 5489). The graph database engine 230 then retrieves the current value for display as the data element 515. As the current value of the Alice entity node 440 is the value of the default state node 450, the graph database engine 230 returns the value of the default state node 450, which is the year "1865", for display as the data element 515, as illustrated in FIG. 5A. Other data elements in FIG. 5A are populated in a similar manner (e.g., identifying nodes using the ID nodes, and retrieving the current values for display as data elements in the workspace user interface 500).

FIG. 5B illustrates a workspace user interface 500 with an edit area 503, according to some example embodiments. As illustrated, the workspace user interface 500 is configured to allow a user 106 to view the data elements in the WYSIWYG view alongside the edit area 503, which is configured to make changes to the WYSIWYG view. It is appreciated that, in some example embodiments, the front-end WYSIWYG view is optional and may, for example, be displayed on pages completely independent from an edit interface, such as the edit area 503.

The edit area 503 has one or more control objects, such as a control interface 527. The control interface 527 allows the user 106 to change the state of the entity nodes. In the illustrated example of FIG. 5B, the control interface 527 has text entry fields for values to be appended after the title of each book. Assuming, for example, that the user 106 wants the listings to display the state of the book (e.g., book being sold) instead of the year a given book was published, the user 106 can then input into a first text box 528 the term "NEW", which indicates that the first book (Alice's Adventures in Wonderland) is in a new condition. The user 106 can further input into a second text box 529 the term "USED", which indicates that the second book (Phantasmagoria) is in a used condition. Upon the user 106 pressing "submit", the workspace UI engine 220 receives the data input into the first text box 528 and second text box 529, and passes the received data values to the graph database engine 230. The graph database engine 230 then creates new current state nodes and stores the received values in them. FIG. 6 shows an illustrative example.

In particular, FIG. 6 shows the graph data structure 405 updated per changes received from a workspace, according to some examples. The value received from the first text box 528 ("NEW") is stored in a current state node 475 which is connected to the Alice entity node 440. The value received from the second text box 529 ("USED") is stored in a current state node 470, which is connected to the entity node 425. The workspace UI engine 220 then updates the node set for the first workspace by removing default state nodes (e.g., default state node 435 and default state node 450) and adding the current state node 470 and current state node 475. In some example embodiments, the node set is further updated to include data indicating which current state node is connected to which entity node (e.g., the current state node 470 is connected to the entity node 425, and the current state node 475 is connected to the entity node 440). For example, the user 106 can choose to display condition instead of publisher year. Assuming the user 106 does select to display the condition of the book instead of displaying the publisher year, the graph database structure illustrated will be modified by adding a new state node with the new value for that workspace. FIG. 6 shows the resulting changes to the graph data structure 405, as a result of the data input through the control interface 527. As illustrated, the "Phantasmagoria" entity node 425 is connected to the current state node 470, which stores the input data value "used". Likewise, the "Alice" entity node 440 is connected to the current state node 475, which stores the input data value of "new".

FIG. 7 illustrates the workspace user interface 500 updated with data from the updated graph data structure 405, according to some embodiments. FIG. 7 is similar to FIG. 5A with the exception of the data element 515, which has a value of "NEW" instead of "1865", and with the exception of the data element 525, which has the value of "USED" instead of "1869". As discussed, the newly created state nodes are connected in an additive manner. That is, new changes from a workspace cause new state nodes to be created, and previously existing state nodes (e.g., default state node 435, default state node 450) are not removed. FIG. 7 may be illustrating a workspace user interface 500 of the workspace that submitted the changes (e.g., changes switching the listings from the published year value to the book condition value), while other workspaces may still show the listings as having published year values.

Figure 8:
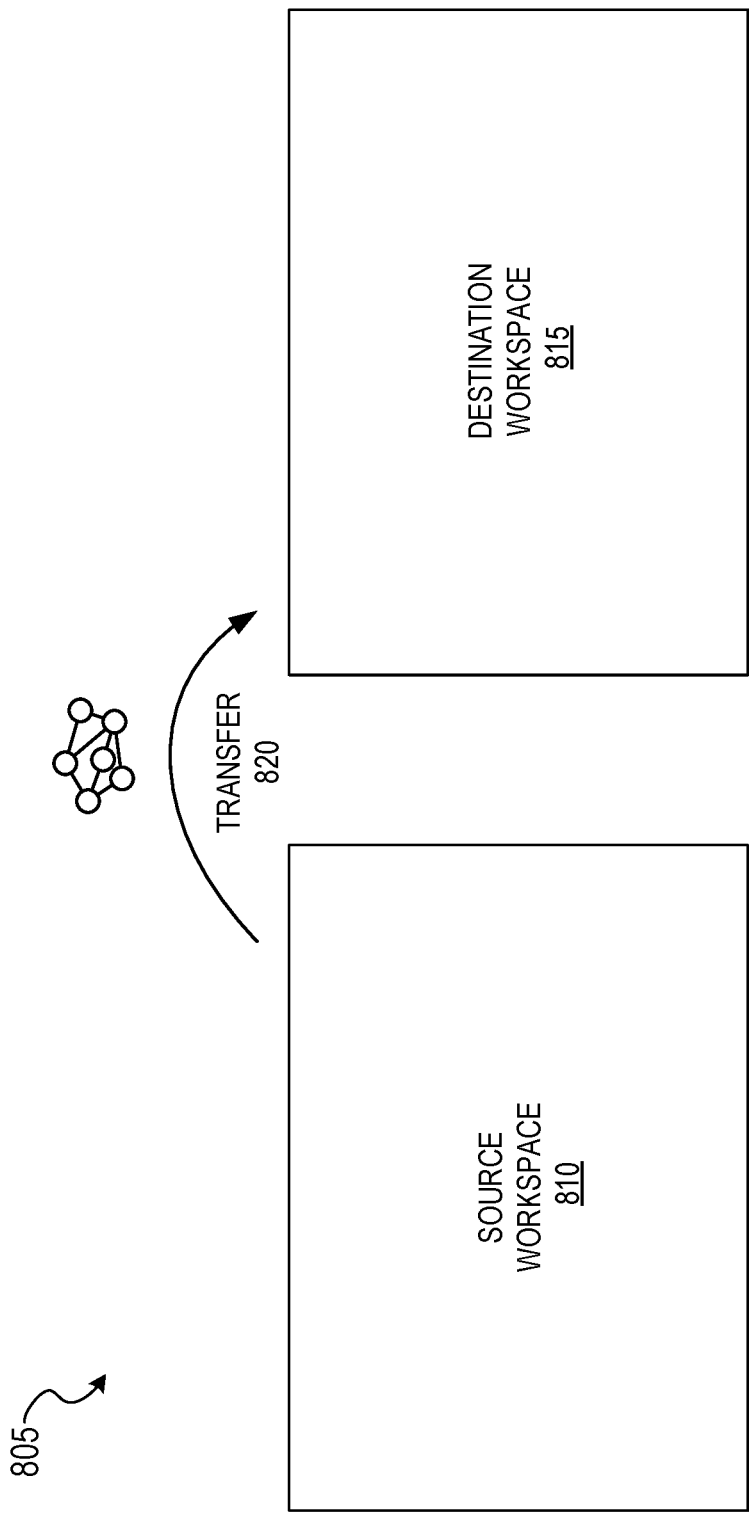
FIG. 8 illustrates an architecture diagram depicting nodes being transferred between two workspaces, according to some example embodiments.

FIG. 8 illustrates an architecture diagram 805 depicting nodes being transferred between two workspaces, according to some example embodiments. When nodes are transferred from one workspace to another workspace, the state of each entity node is reset to the value of the default state node for each respective entity node. Resetting the nodes to their default state values can, in some example embodiments, simplify node management as nodes are transferred between different workspaces. In the example embodiment illustrated in FIG. 8, a set of nodes is transferred from a source workspace 810 to a destination workspace 815. Continuing the above example, assume that the default state nodes contain the published year data, but that current nodes have been connected to entity nodes storing the newer book condition data. At operation 820, each of the entity nodes is reset to its default current node value. Thus, upon being displayed in the destination workspace 815, the transferred nodes will again display the published year data for each of the entity nodes. In some embodiments, the values can be reset to different points in time, or to different state nodes, upon being transferred to the destination workspace 815. For example, in some example embodiments, assume that an entity node has five state nodes connected to it: a default state node, a first state node, a second state node, a third state node, and a current state node. Each of the state nodes stores values for changes made to the entity node, in a time sequential manner. That is, for example, the default state node was initially created and stored an default value for the entity node, then the first state node was created to store a value at a first point in time, the second state node was created to store a value at a later second point in time, and the current state node stores the last received change to the entity node.

In some example embodiments, resetting to different state nodes is implemented by changing what state node is assigned as the default state node. The nodes that reflect updates occurring after the update to the currently assigned state node can be reset to whatever node is currently assigned as the default state node.

In some example embodiments, entity nodes are reset to state nodes that are not the default state nodes and not the current state node. For example, the entity node having five state nodes may be transferred to the destination workspace 815 and be reset to the second state node value during the transfer. In some example embodiments, the nodes are configured to be reset to the relative offset (e.g., reset entity node to the third from last state node). In some example embodiments, the transfer engine 250 identifies whether the transferred entity node existed at one point in time in the destination workspace 815, and sets the transferred entity node to the last state node that the entity node was assigned in the destination workspace 815. In some example embodiments, the transferred entity node already exists in the destination workspace 815, and the transferred node is not transferred.

In some embodiments, the state node currently active or in the node set of the source workspace 810 is used to override the value of the already existing entity node in the destination workspace 815. For example, assume that the source workspace 810 and destination workspace 815 both manage the Phantasmagoria entity node 425. Further assume that the source workspace 810 displays the Phantasmagoria listing with the published year data and the destination workspace 815 displays the Phantasmagoria listing with the book condition data. In some example embodiments, the user 106 may select a group of nodes for transfer to the destination workspace 815. The multi workspace engine 150 may be configured to overwrite existing values of nodes in the destination workspace 815. Thus, upon the Phantasmagoria entity node 425 being transferred, the destination workspace 815 has its node set updated so that the Phantasmagoria listing from the destination workspace 815 shows the published year data. In this way, transferred nodes can be reset to different state node values because all state node values are tracked in the same graph database 155 and all workspaces share the graph database 155 to manage data.

Figure 9:
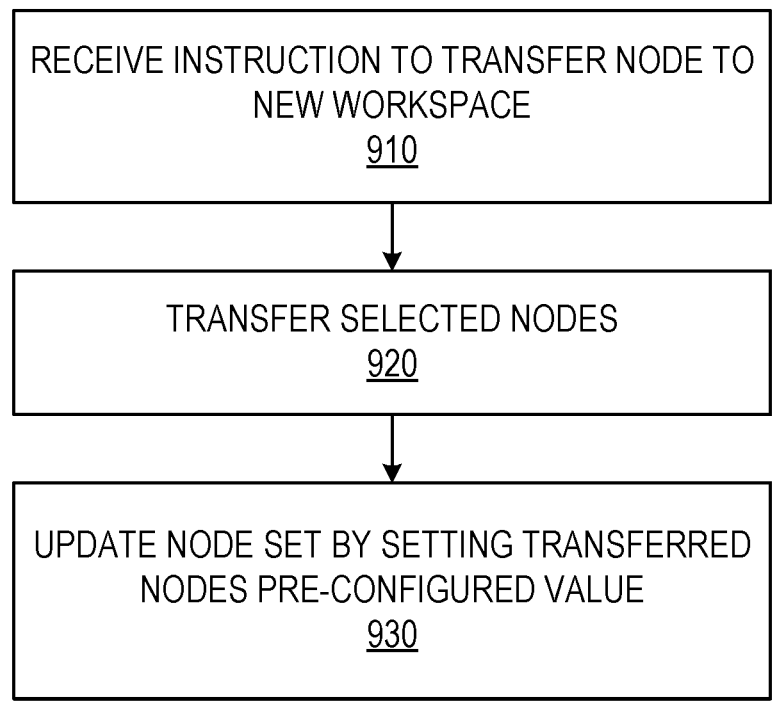
FIG. 9 illustrates a flow diagram of a method for transferring nodes between workspaces, according to some example embodiments.

FIG. 9 illustrates a flow diagram of a method 900 for transferring nodes between workspaces, according to some example embodiments. At operation 910, the transfer engine 250 receives instructions to transfer nodes to the destination workspace 815. At operation 920, the transfer engine 250 transfers the selected nodes to the destination workspace 815. At operation 930, the transfer engine 250 updates the node set for the destination workspace 815. In some example embodiments, the transfer engine 250 sets the state of the entity nodes to a pre-configured value upon transfer. For example, the pre-configured value may be the default state node; thus, upon transferring the selected nodes, the transfer engine 250 resets the transferred nodes to their default state node vales (e.g., by updating the node set of the destination workspace 815 to include the default state nodes for the transferred entity nodes). Similarly, the transfer engine 250 may reset the transferred nodes to different values of different state nodes, as discussed above with reference to FIG. 8.

Figure 10:
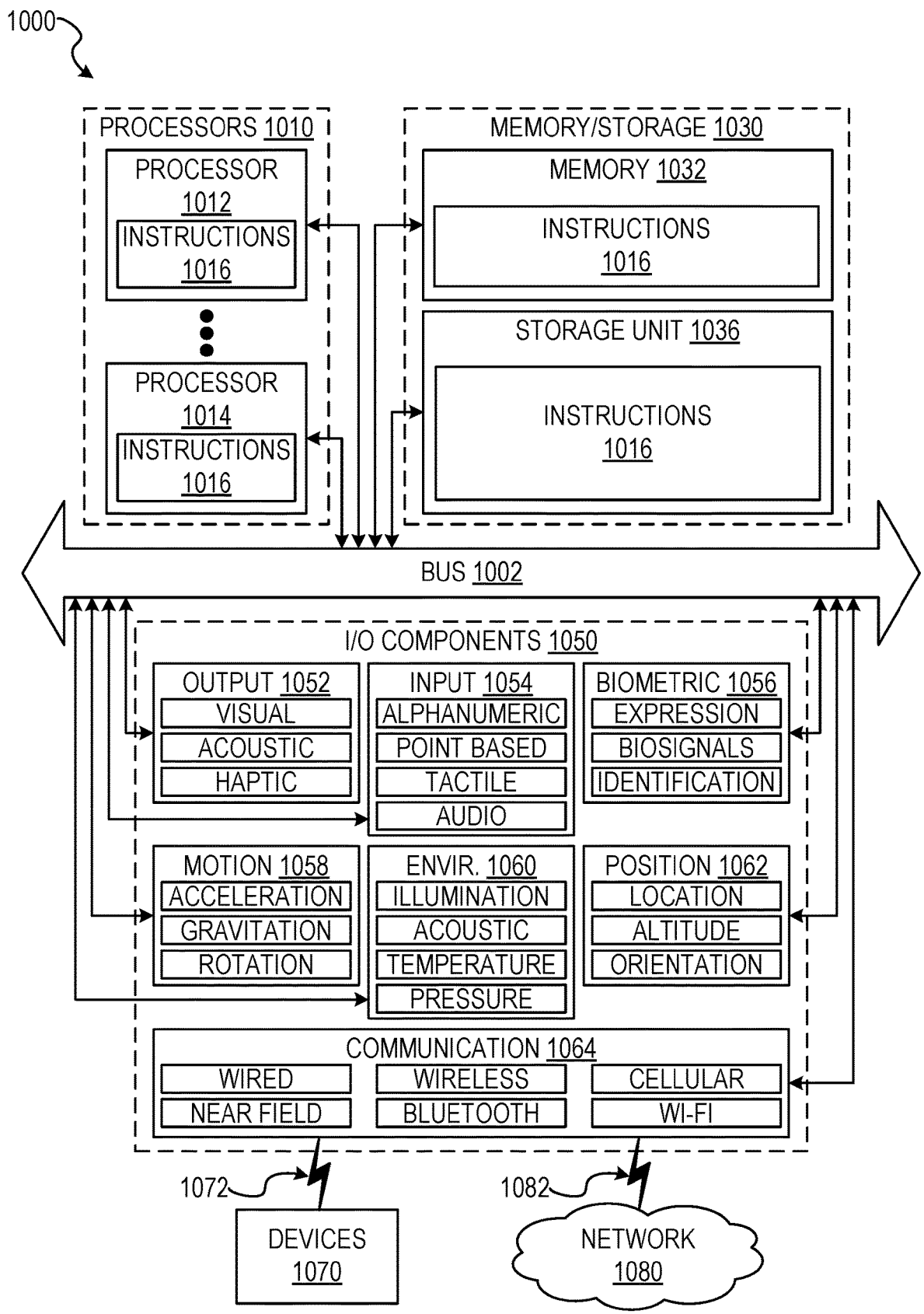
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 can cause the machine 1000 to execute the flow diagrams of FIGS. 3A, 3B, and 9. Additionally, or alternatively, the instructions 1016 can implement the interface engine 210, the workspace user interface (UI) engine 220, the graph database engine 230, the transfer engine 250, and so forth. The instructions 1016 transform the general, non-programmed machine 1000 into a particular machine 1000 programmed to carry out the described and illustrated functions in the manner described. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) can include, for example, a processor 1012 and a processor 1014 that may execute the instructions 1016. The term "processor" is intended to include multi-core processors 1010 that may comprise two or more independent processors 1012, 1014 (sometimes referred to as "cores") that can execute the instructions 1016 contemporaneously. Although FIG. 10 shows multiple processors 1010, the machine 1000 may include a single processor 1012 with a single core, a single processor 1012 with multiple cores (e.g., a multi-core processor), multiple processors 1012, 1014 with a single core, multiple processors 1012, 1014 with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" means a device able to store the instructions 1016 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 can include a wide variety of components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1050 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 can detect identifiers or include components operable to detect identifiers. For example, the communication components 1064 can include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 can be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of managing data displayed on user interfaces of client devices, the method comprising:
   providing a first workspace user interface for a first client device and a second workspace user interface for a second client device, each of the first workspace user interface and the second workspace user interface configured to initially display a default value that is associated with a default state node stored in a single database;
   receiving, through the first workspace user interface of the first client device, a request to update the default value associated with the default state node in the single database with an updated value;
   in response to receiving the request, generating and storing a current state node in the single database;
   storing the updated value in the current state node;
   configuring the first workspace user interface to display the updated value stored in the current state node in the single database, the second workspace user interface configured to display the default value associated with the default state node in the single database;
   receiving, through the first workspace user interface, an additional request to transfer the updated value stored in the current state node to the second workspace user interface; and
   initiating transfer of the updated value stored in the current state node to the second workspace user interface, the transfer causing the second client device to replace the default value stored in the default state node with the updated value and to configure the second workspace user interface to display the updated value.

2. The method as described in claim 1, wherein the default value is stored in a first node set and a second node set, the first node set including nodes with data configurable to be displayed on the first workspace user interface, and the second node set including nodes with data configurable to be displayed on the second workspace user interface.

3. The method as described in claim 2, wherein the nodes in each of the first node set and the second node set include at least an entity node, the default state node, and an identification node such that the default state node and the identification node include data associated with the entity node, and the default value is stored in the default state node included in each of the first node set and the second node set.

4. The method as described in claim 3, further including:
   replacing the default value stored in the default state node of the first node set with the updated value upon receiving the request to update the default value configured to be displayed on the first client device.

5. The method as described in claim 3, further comprising retaining the default value in the default state node included in the first node set.

6. The method as described in claim 3, further including:
   receiving, through the second workspace user interface of the second client device, a request to update the default value configured to be displayed on the second client device;
   replacing the default value stored in the default state node included in the second node set with the updated value and associating the second workspace user interface with the updated value; and
   configuring the second workspace user interface to display the updated value.

7. The method as described in claim 3, further including:
   receiving, through the second workspace user interface of the second client device, a request to update the default value configured to be displayed on the second client device;
   generating, upon receiving the request to update the default value, an additional default state node in the second node set and storing the updated value in the additional state node; and configuring the second workspace user interface to display the updated value in the additional default state node, and retaining the default value in the default state node of the second node set.

8. The method as described in claim 3, further comprising:
instructing, upon receipt of the additional request, the second client device to replace the default value stored in the default state node included in the second node set with the updated value.

9. A server comprising one or more processors and one or more computer readable storage media storing instructions that, when executed, cause the one or more processors to perform operations comprising:
providing a first workspace user interface for a first client device and a second workspace user interface for a second client device, each of the first workspace user interface and the second workspace user interface configured to initially display a default value that is associated with a default state node stored in a single database;
receiving, through the first workspace user interface of the first client device, a request to update the default value associated with the default state node in the single database with an updated value;
in response to receiving the request, generating and storing a current state node in the single database;
storing the updated value in the current state node;
configuring the first workspace user interface to display the updated value stored in the current state node in the single database, the second workspace user interface configured to display the default value associated with the default state node in the single database;
receiving, through the first workspace user interface, an additional request to transfer the updated value stored in the current state node to the second workspace user interface; and
initiating transfer of the updated value stored in the current state node to the second workspace user interface, the transfer causing the second client device to replace the default value stored in the default state node with the updated value and to configure the second workspace user interface to display the updated value.

10. The server as described in claim 9, wherein the default value is stored in a first node set and a second node set, the first node set including nodes with data configurable to be displayed on the first workspace user interface, and the second node set including nodes with data configurable to be displayed on the second workspace user interface.

11. The server as described in claim 10, wherein the nodes in each of the first node set and the second node set include at least an entity node, the default state node, and an identification node such that the default state node and the identification node include data associated with the entity node, and the default value is stored in the default state node included in each of the first node set and the second node set.

12. The server as described in claim 11, wherein the instructions, when executed, further cause the one or more processors to perform operations including:
replacing the default value stored in the default state node of the first node set with the updated value upon receiving the request to update the default value configured to be displayed on the first client device.

13. The server as described in claim 11, wherein the operations further comprise retaining the default value in the default state node included in the first node set.

14. The server as described in claim 11, wherein the instructions, when executed, further cause the one or more processors to perform operations including:
receiving, through the second workspace user interface of the second client device, a request to update the default value configured to be displayed on the second client device;
replacing the default value stored in the default state node included in the second node set with the updated value and associating the second workspace user interface with the updated value; and
configuring the second workspace user interface to display the updated value.

15. The server as described in claim 11, wherein the instructions, when executed, further cause the one or more processors to perform operations including:
receiving, through the second workspace user interface of the second client device, a request to update the default value configured to be displayed on the second client device;
generating, upon receiving the request to update the default value, an additional default state node in the second node set and storing the updated value in the additional state node; and
configuring the second workspace user interface to display the updated value in the additional default state node, and retaining the default value in the default state node of the second node set.

16. The server as described in claim 11, wherein the instructions, when executed, further cause the one or more processors to perform operations including
instructing, upon receipt of the additional request, the second client device to replace the default value stored in the default state node included in the second node set with the updated value.

17. A system of managing data displayed on user interfaces of client devices, the system comprising:
means for providing a first workspace user interface for a first client device and a second workspace user interface for a second client device, each of the first workspace user interface and the second workspace user interface configured to initially display a default value that is associated with a default state node stored in a single database;
means for receiving, through the first workspace user interface of the first client device, a request to update the default value associated with the default state node in the single database with an updated value;
means for generating and storing a current state node in the single database;
means for storing the updated value in the current state node;
means for configuring the first workspace user interface to display the updated value stored in the current state node in the single database, the second workspace user interface configured to display the default value associated with the default state node in the single database;
means for receiving, through the first workspace user interface, an additional request to transfer the updated value stored in the current state node to the second workspace user interface; and
means for initiating transfer of the updated value stored in the current state node to the second workspace user interface, the transfer causing the second client device to replace the default value stored in the default state node with the updated value and to configure the second workspace user interface to display the updated value.

18. The system as described in claim 17, wherein the default value is stored in a first node set and a second node set, the first node set including nodes with data configurable to be displayed on the first workspace user interface, and the second node set including nodes with data configurable to be displayed on the second workspace user interface.

19. The system as described in claim 18, wherein the nodes in each of the first node set and the second node set include at least an entity node, the default state node, and an identification node such that the state node and the identification node include data associated with the entity node, and the default value is stored in the default state node included in each of the first node set and the second node set.

20. The system as described in claim 19, further including:
   means for replacing the default value stored in the default state node of the first node set with the updated value upon receiving the request to update the default value configured to be displayed on the first client device.

\* \* \* \* \*